(12) United States Patent
Takahashi et al.

(10) Patent No.: US 6,504,333 B2
(45) Date of Patent: Jan. 7, 2003

(54) NUMERICAL CONTROL APPARATUS

(75) Inventors: Nobuyuki Takahashi, Tokyo (JP); Kiyotaka Kato, Tokyo (JP); Kenji Iriguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 157 days.

(21) Appl. No.: 09/793,486

(22) Filed: Feb. 27, 2001

(65) Prior Publication Data

US 2001/0024098 A1 Sep. 27, 2001

(30) Foreign Application Priority Data

Mar. 9, 2000 (JP) ........................... 2000-064235

(51) Int. Cl.⁷ .............................................. G05B 19/25
(52) U.S. Cl. ........................................................ 318/570
(58) Field of Search ................................... 318/569–579

(56) References Cited

U.S. PATENT DOCUMENTS 5,015,130 A * 5/1991 Matsuura et al. ............ 318/578
6,353,301 B1 * 3/2002 Niwa ........................... 318/569
6,437,534 B1 * 8/2002 Kakino et al. ............... 318/569

OTHER PUBLICATIONS

Shirase et al., "Trial Of NC Programless Milling For A Basic Autonomous CNC Machine Tool", Proceedings of the 2000 Japan–USA Flexible Automation Conference, Jul. 2000, pp. 1–7.

"Study On Real Time Processing Applying Shape Interpolation Of Boundary–Map Method", Collected Articles for Academic Lectures in the Spring Convention of the Japan Society for Precision Engineering, 1999, p. 385.

* cited by examiner

*Primary Examiner*—Jeffrey Donels
(74) *Attorney, Agent, or Firm*—Leydig, Voit & Mayer, Ltd.

(57) ABSTRACT

A numerical control system includes a curved-surface state evaluating unit for forming curved-surface evaluation data of evaluation points by arranging, virtually, the tool on a given scheduled path locus, that serves as the criterion of movement of a tool, to come into contact with a processed surface of a processing object, and by setting a plurality of evaluation points to evaluate the shape of the curved surface, a command speed deciding unit for deciding a command speed appropriately by using a passing speed and other data in the evaluation data, and a tool position data forming unit for calculating quickly a succeeding tool position by utilizing the evaluation data. The operations are performed in real time.

9 Claims, 13 Drawing Sheets

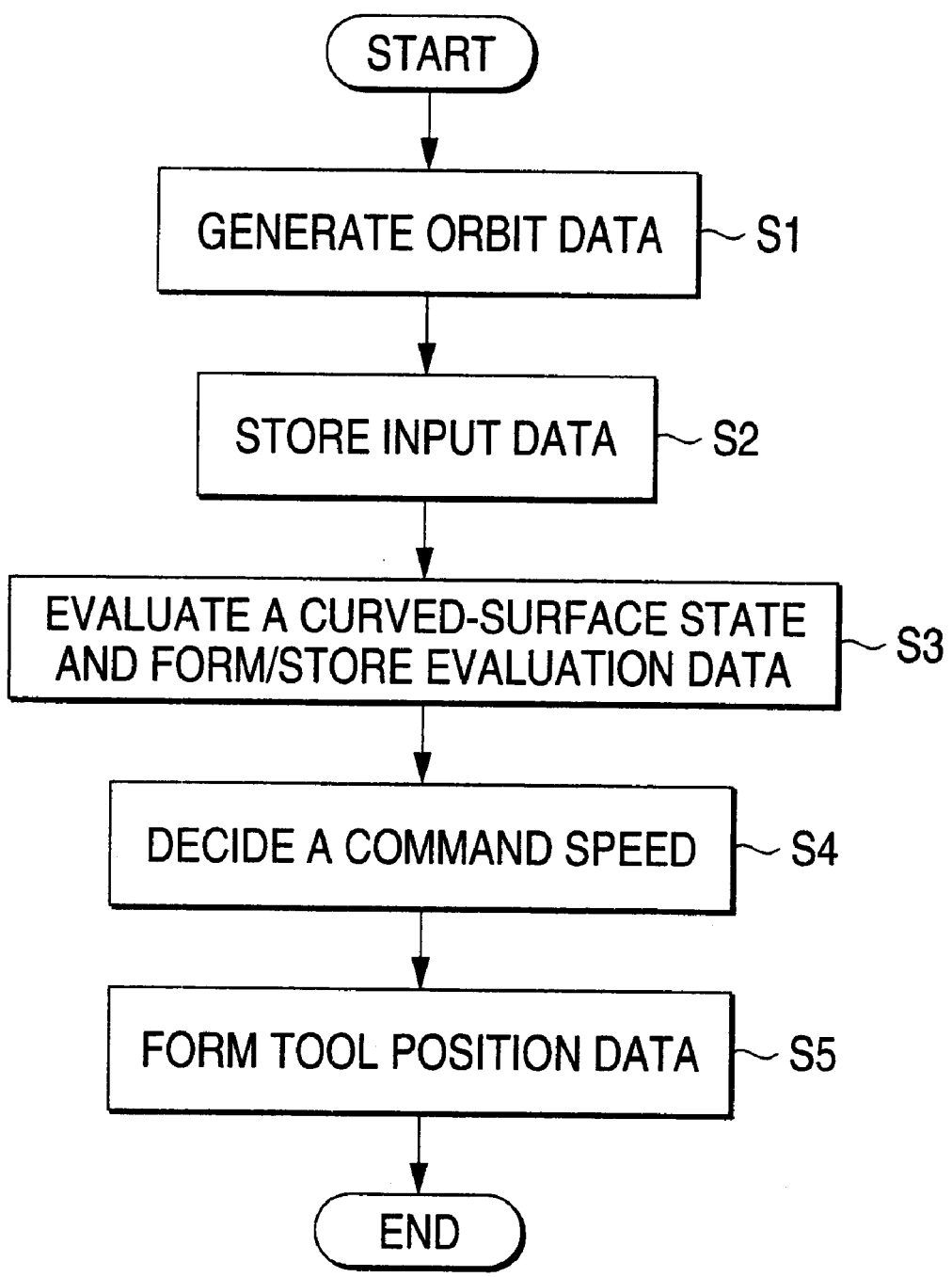

NUMERICAL CONTROL APPARATUS

BACKGROUND OF THE INVENTION

1. Field of the Invention

The present invention relates to the improvement of a numerical control apparatus employed to control a machine tool, for example.

2. Description of the Related Art

In the prior art, upon working a die or mould having a free-form surface, tool path data are formed by representing approximately the tool path by infinitesimal segments such as a straight line, a circular arc, a curve, etc. when the tool is moved virtually by using the CAD/CAM system so as to come into contact with the free-form surface, and then the cutting is executed by providing such tool path data to the numerically controlled machine tool.

In general, in case the curved surface working is executed by the numerically controlled machine tool, the number of tool path data items formed by the CAD/CAM system is enormous. In particular, in recent working by the high speed cutting, a method is employed so that a surface close to a specular surface can be produced by reducing the working pick feed to be as small as possible and thus the burden of the subsequent polishing step can be reduced or the polishing step can be omitted.

In such working, the working precision must be improved by increasing the number of commands of the infinitesimal segments constituting the tool path data. However, when the number of shape commands of the infinitesimal segments is increased, the tool is stopped at every joint of the shape commands and thus the working efficiency is lowered.

In order to overcome such problem, there is the method disclosed in Patent Application Publication (KOKAI) Hei 7-239708, for example. This method implements working with good efficiency by moving the tool at a maximum speed that does not exceed the allowable speed of the machine, without stopping the tool at every joint of the shape commands.

Also, sometimes correction of the tool diameter is needed on the spot because of tool wear and tool exchange. However, in three-dimensional curved-surface working, it is difficult to correct an offset distance since a surface is often cut by a ball end mill, and therefore an enormous number of tool path data must be calculated again and again by using the CAD/CAM system.

In the numerical control apparatus in the prior art, the tool path data are formed by approximating the tool path by the infinitesimal segments based on mould shape data, and then interpolation points are calculated to instruct the tool positions, by interpolating the segments of the numerical control apparatus. Therefore, it cannot be assured whether the tool can be brought into contact with the curved-surface when the tool is arranged at the interpolation points.

Then, an increase in the number of infinitesimal segments of the tool path data that are formed by the CAD/CAM system and transferred to the numerical control apparatus is limited from the viewpoint of data transfer. Also, if the working speed is increased up to the limit of the allowable speed of the machine, as in Patent Application Publication (KOKAI) Hei 7-239708, the allowable speed must be checked at every joint of the infinitesimal segments and thus the time to check the data processing is increased. Further, since the acceleration/deceleration of the tool is carried out by setting the time constant of the machine constant, the acceleration/deceleration cannot be carried out up to the limit of the allowable acceleration. Thus, since it takes a lot of time to execute the acceleration/deceleration, it is impossible to reduce the working time.

Also, in order to interpolate smoothly the tool path derived by the tool path data and reproduce an accurate corner of an edge, a deceleration area must be estimated based on the information of the infinitesimal segments. Thus, it is impossible to disregard the error caused at the end of the segment as the segments are minimized more and more to get a sufficiently smooth tool path. For this reason, it is impossible to decide which one of a corner portion and a part of a curve is represented by a segment, and thus there is the problem that working quality cannot be improved.

Further, correction of tool diameter is needed on the spot because of tool wear or tool exchange, and thus the enormous number of tool path data items must be calculated each time by the CAD/CAM system. As a result, the operation efficiency is significantly decreased.

In addition, since the worked surface of the working object is not evaluated in itself, it is impossible to improve the working efficiency by increasing the working speed as highly as possible according to the situation of the worked surface itself.

Further, correction of tool diameter is needed on the spot because of tool wear or tool exchange, and thus the enormous number of tool path data items must be calculated each time by the CAD/CAM system. As a result, the operation efficiency is significantly decreased.

SUMMARY OF THE INVENTION

The present invention has been made to overcome above problems, and it is an object of the present invention to provide a numerical control apparatus and a numerically controlling method described as follows.

a. The preparation of tool path data transmitted to the numerical control apparatus from a CAD/CAM system in the prior art can be omitted, and a tool position as a process applying portion position can be decided based on a shape of a worked surface of a working object as a processed surface of a processing object.

b. The appropriate moving speed and the process applying portion position can be quickly decided in response to the shape of the processed surface based on evaluation data obtained by evaluating a shape of the processed surface of the processing object, and thus a processing time can be reduced.

c. An amount of stored data can be reduced by executing evaluation of the processed surface of the processing object and decision of the process applying portion position in real time, and thus an overall data processing time can be shortened.

d. The productivity can be improved according to above features.

In order to achieve the above object, a numerical control apparatus of the present invention comprises evaluating means for forming evaluation data of an evaluation point containing a pointer representing a position of a succeeding clamp point, a path length to the succeeding clamp point, and a passing speed of a process applying portion to be passed through the evaluation point if the evaluation point corresponds to a clamp point, by arranging virtually the process applying portion of a system to be numerically controlled on a given scheduled path locus to come into contact with a processed surface of a processing object and by setting a plurality of evaluation points to evaluate a shape of the processed surface, where the clamp point signifies the evaluation point that is decided based on the shape of the processed surface such that the passing speed of the process applying portion passing through the evaluation point is subjected to restriction; command speed deciding means for deciding a command speed, at which the process applying portion is moved, by calculating a distance from a current process applying portion position to a closest succeeding evaluation point and then deciding necessity of a deceleration based on a path length from the current process applying portion position to the succeeding clamp point, that is calculated by reading the path length to the succeeding clamp point in evaluation data of the closest succeeding evaluation point and then adding such path length to this distance, the passing speed in the evaluation data of the clamp point, that is calculated by employing the pointer in the evaluation data of the closest succeeding evaluation point, and a speed of the current process applying portion; and process applying portion position data forming means for calculating a process applying portion position by arranging virtually the process applying portion to separate from a current process applying portion position by a predetermined distance and to come into contact with the processed surface, and then providing this calculated process applying portion position to the system to be numerically controlled.

Therefore, since the evaluation data containing such contents are formed by evaluating the shape of the processing object, the speed of the process applying portion can be set appropriately in response to the shape and also the command speed can be decided to increase the processing speed. Also, since formation of the evaluation data and decision of the process applying portion position can be made based on the shape of the processing object, they can be decided from the shape of the processing object without the intervention of intermediate data and thus the increase of an amount of prepared data can be suppressed. As a result, the productivity can be improved.

Then, a numerical control apparatus of the present invention comprises evaluating means for forming evaluation data of an evaluation point containing a distance to a succeeding evaluation point, by arranging virtually a process applying portion of a system to be numerically controlled on a given scheduled path locus to come into contact with a processed surface of a processing object and by setting a plurality of evaluation points to evaluate a shape of the processed surface; command speed deciding means for deciding a command speed, at which the process applying portion is moved, by deciding necessity of a deceleration based on the evaluation data; and process applying portion position data forming means for calculating an evaluation point such that a path length that is a sum of distances obtained by adding successively distances to a succeeding evaluation point in the evaluation data of respective evaluation points exceeds a predetermined length while using a succeeding evaluation point closest to a current process applying portion position as an initial point, then searching a process applying portion position, that is separated from the current process applying portion position by a predetermined distance, by arranging virtually the process applying portion to come into contact with the processed surface while using this calculated evaluation point as a starting point, and then providing this searched process applying portion position to the system to be numerically controlled.

Therefore, if the evaluation data containing the distance to the succeeding evaluation point are formed by evaluating the shape of the processing object, the succeeding process applying portion position separated from the current process applying portion position by a predetermined distance can be calculated by utilizing the evaluation data to skip the evaluation points located from the current process applying portion position to the searched evaluation point while using the searched evaluation point as the starting point, and therefore such succeeding process applying portion position can be quickly decided. Also, since formation of the evaluation data and decision of the process applying portion position can be made based on the shape of the processing object, they can be decided from the shape of the processing object without the intervention of intermediate data and thus the increase of an amount of prepared data can be suppressed.

In addition, a numerical control apparatus of the present invention comprises evaluating means for forming evaluation data of an evaluation point containing a pointer representing a position of a succeeding clamp point, a path length to the succeeding clamp point, and a passing speed of a process applying portion to be passed through the evaluation point if the evaluation point corresponds to a clamp point, by arranging virtually the process applying portion of a system to be numerically controlled on a given scheduled path locus to come into contact with a processed surface of a processing object and by setting a plurality of evaluation points to evaluate a shape of the processed surface, where the clamp point signifies the evaluation point that is decided based on the shape of the processed surface such that the passing speed of the process applying portion passing through the evaluation point is subjected to restriction; command speed deciding means for deciding a command speed, at which the process applying portion is moved, by calculating a distance from a current process applying portion position to a closest succeeding evaluation point and then deciding necessity of a deceleration based on a path length from the current process applying portion position to the succeeding clamp point, that is calculated by reading the path length to the succeeding clamp point in evaluation data of the closest succeeding evaluation point and then adding such path length to this distance, the passing speed in the evaluation data of the clamp point, that is calculated by employing the pointer in the evaluation data of the closest succeeding evaluation point, and a speed of the current process applying portion; and process applying portion position data forming means for calculating an evaluation point such that a path length that is a sum of distances obtained by adding successively distances to a succeeding evaluation point in the evaluation data of respective evaluation points exceeds a predetermined length while using a succeeding evaluation point closest to a current process applying portion position as an initial point, then searching a process applying portion position, that is separated from the current process applying portion position by a predetermined distance, by arranging virtually the process applying portion to come into contact with the processed surface while using this calculated evaluation point as a starting point, and then providing this searched process applying portion position to the system to be numerically controlled.

Therefore, since the evaluation data containing such contents are formed by evaluating the shape of the processing object, the speed of the process applying portion can be set appropriately in response to the shape and also the command speed can be decided to increase the processing speed. Also, the succeeding process applying portion position separated from the current process applying portion position by a predetermined distance can be calculated by utilizing the evaluation data to skip the evaluation points located from the current process applying portion position to the searched evaluation point while using the searched evaluation point as the starting point, and therefore such succeeding process applying portion position can be quickly decided. Also, since formation of the evaluation data and decision of the process applying portion position can be made based on the shape of the processing object, they can be decided from the shape of the processing object without the intervention of intermediate data and thus the increase of an amount of prepared data can be suppressed.

Further, the evaluating means picks up three successive evaluation points from the evaluation points, and then executes evaluation of the processed surface based on a curvature of a circular arc passing through three points. Therefore, the evaluation can be performed appropriately by executing the evaluation of the processes surface in response to the curvature.

Besides, respective operations of the evaluating means, the command speed deciding means, and the process applying portion position data forming means are executed in real time.

Therefore, the overall processing time can be shortened by executing these operations in real time and thus the productivity can be improved.

BRIEF DESCRIPTION OF THE DRAWINGS

FIG. 2 is a flowchart showing an overall operation of the numerical control apparatus;

DETAILED DESCRIPTION OF THE PREFERRED EMBODIMENTS

Figure 1:
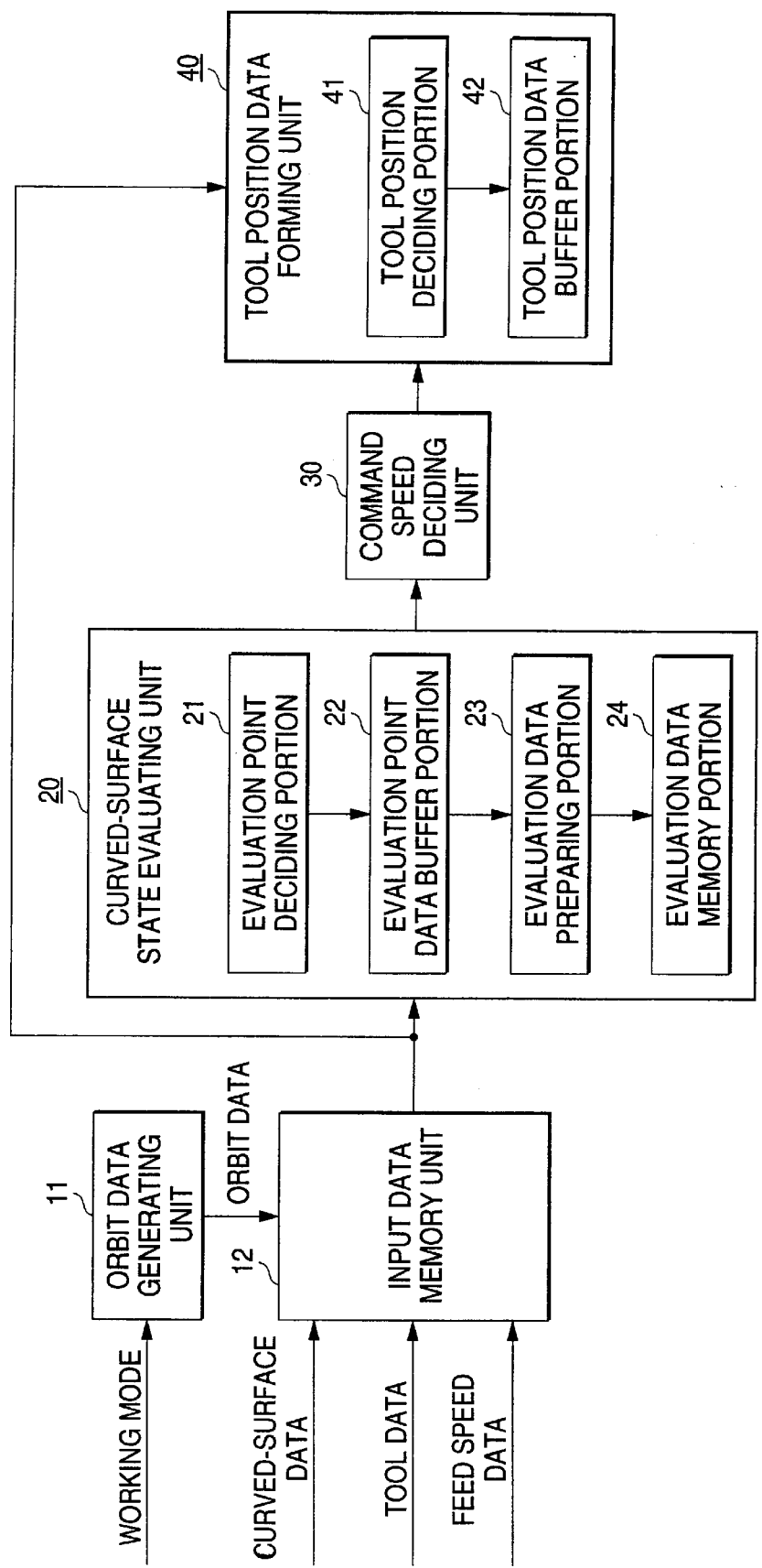
FIG. 1 is a block diagram showing a configuration of a numerical control apparatus according to an embodiment of the present invention.

FIG. 1 is a block diagram showing a configuration of a numerical control apparatus according to an embodiment of the present invention. In FIG. 1, an orbit data generating unit 11 generates orbit data, that define scheduled path locus on an XY plane on which the tool of the numerically controlled machine tool as the process applying portion of the system to be numerically controlled should be moved, based on the moving mode, i.e., the working mode by which the curved-surface should be worked, and then outputs the orbit data to an input data memory unit 12. Details of the scheduled path locus will be described later.

The curved-surface of the working object is an example of the processed surface of the processing object in the present invention. The numerically controlled machine tool to be numerically controlled is an example of the system to be numerically controlled in the present invention. The tool is an example of the process applying portion of the system to be numerically controlled in the present invention.

The input data memory unit 12 stores input data such as the orbit data generated by the above orbit data generating unit 11, three-dimensional curved-surface data, too data, feed speed data, etc., that are necessary for the numerically controlled working. Where the above curved-surface data represent shapes of the worked surface of the working object, and contain NURBS (Non Uniformed Rational B-Spline) curved-surface, etc. In the case of this NURBS curved-surface, rank, knot vector, control point, and weight are input as the curved-surface data. But any curved-surface data may be employed.

Data such as tool type, e.g., ball end mill, flat end mill, radial end mill, etc., tool diameter of the tool, etc. are input as the tool data. The feed speed data means a user set speed that is the tool feed speed set by the user. The user set speed fu can be set within the range of the allowable speed fmax of the machine.

Figure 9:
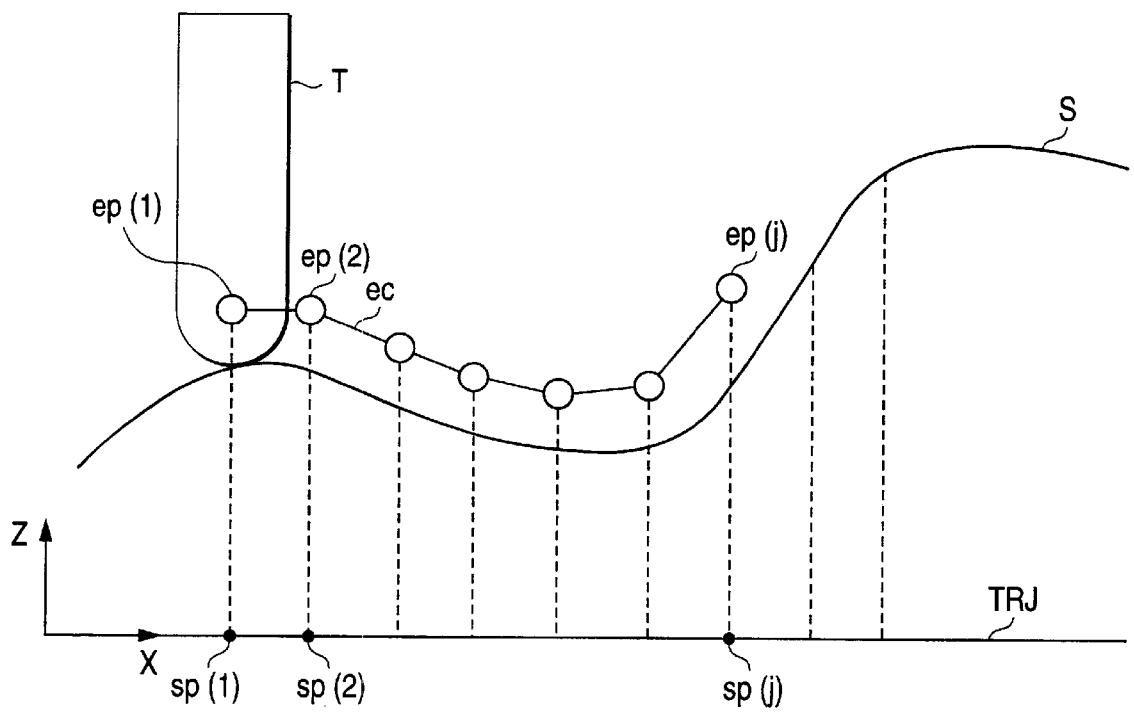
FIG. 9 is a view showing the evaluation points calculated to evaluate the curved surface.

A curved-surface state evaluating unit 20 comprises an evaluation point deciding portion 21, an evaluation point data buffer portion 22, an evaluation data preparing portion 23, and an evaluation data memory portion 24. The evaluation point deciding portion 21 decides the condition of the curved-surface, i.e., evaluation points to evaluate the state of the curved-surface, based on the curved-surface data. The evaluation point data buffer portion 22 stores temporarily a plurality of evaluation points that are decided by the evaluation point deciding portion 21.

Where the evaluation point means the tool position when the tool is virtually arranged on X, Y coordinates of the sampling points on the scheduled path locus to come just into contact with the curved-surface (see sampling points sp(1), sp(2), . . . , sp(j), evaluation points ep(1), ep(2), . . . , ep(j) in FIG. 9 described later).

The evaluation data preparing portion 23 evaluates the condition of the curved-surface to be worked currently based on the curved-surface data stored in the input data memory unit 12 to correspond to the evaluation points, and then forms evaluation data every evaluation point. Details of the evaluation data will be described later. The evaluation data memory portion 24 stores the evaluation data derived by the evaluation data preparing portion 23.

A command speed deciding unit 30 decides a command speed, by which the tool should be moved, based on the evaluation data stored in the evaluation data memory portion 24.

A tool position data forming unit 40 serving as the process applying portion position data forming unit includes a tool position deciding portion 41 and a tool position data buffer portion 42. The tool position deciding portion 41 decides the tool position based on the command speed supplied from the command speed deciding unit 30 and the curved-surface data stored in the input data memory unit 12. The tool position is calculated by executing the interference avoidance calculation between the tool and the curved-surface from the above command speed. The tool position data buffer portion 42 stores temporarily the tool position decided by the tool position deciding portion 41 and sends it to a servo control portion (not shown) as occasion demands.

The tool position is given by the X, Y, Z axes coordinates representing the tool position to be out put by the numerical control apparatus every predetermined time interval. A collection of the coordinates representing the tool position is the tool position data.

Based on the tool position data received from the tool position data buffer portion 42 of the tool position data forming unit 40 as the digital signals representing the tool position, the servo control portion (not shown) calculates pulse numbers ΔX, ΔY, ΔZ, that are equivalent to tool moving values in the X, Y, Z axis direction respectively, from differences between the coordinates of the currently observed tool position (referred to as "current tool position" hereinafter) and the coordinates of the succeeding tool position, and then controls a servo motor.

Figure 3A:
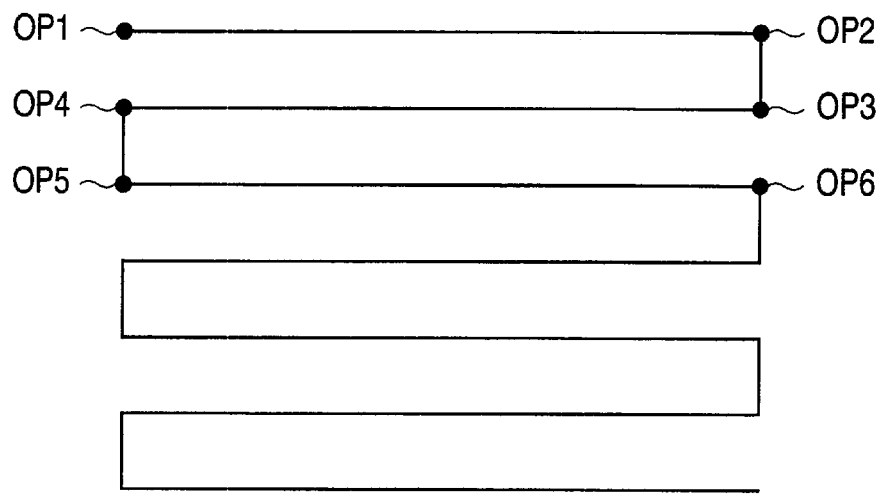
FIGS. 3A and 3B are views showing an example of working modes.
Figure 3B:
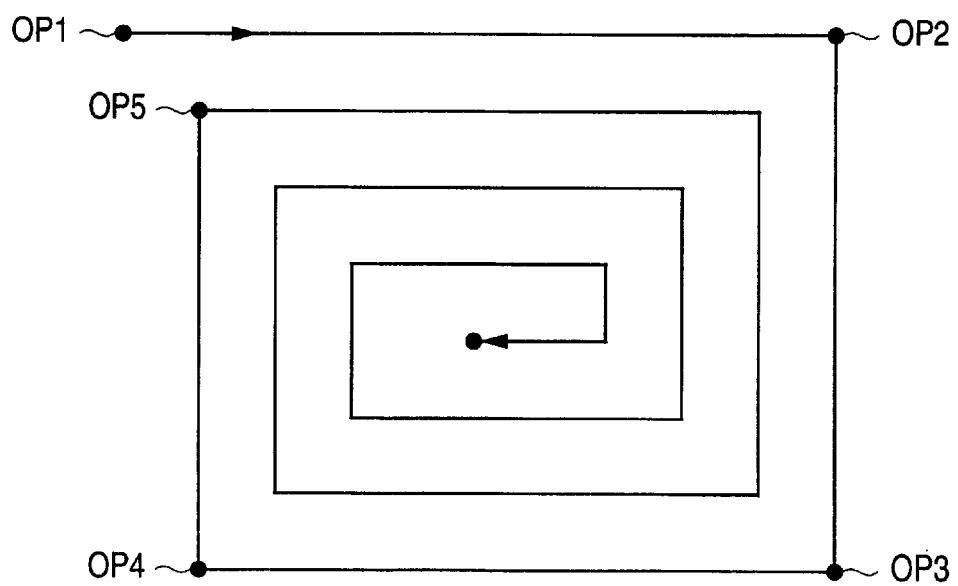
Figure 4:
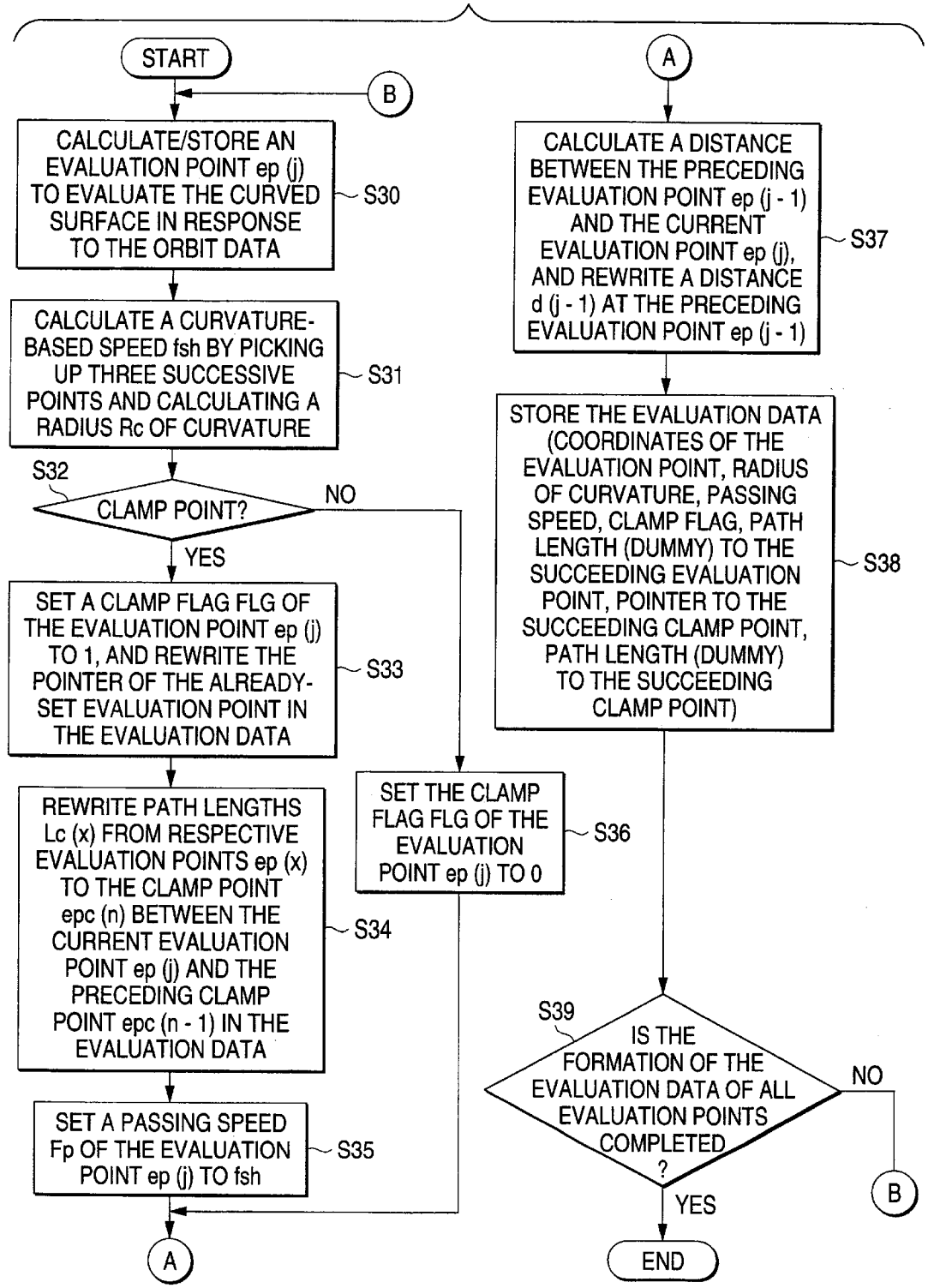
FIG. 4 is a flowchart showing an operation of a curved-surface state evaluating unit in FIG. 1.

Next, an operation will be explained hereunder. First an overall rough operation will be explained, and then detailed operations of respective portions will be explained. FIG. 2 is a flowchart showing an overall operation of the numerical control apparatus. FIGS. 3A and 3B are views showing an example of working modes. FIG. 4 is a flowchart showing an operation of a curved-surface state evaluating unit in FIG. 1.

First, the overall operation will be explained with reference to the flowchart in FIG. 2.

In step S1, the orbit data generating unit 11 generates the orbit data based on the working mode as the given processing mode. The working mode must be set to work the curved-surface. In step S1, the orbit data are generated based on this set working mode.

The orbit data are data indicating how the tool should be moved. Here, the orbit data generating unit 11 generates the orbit data as the data indicating the scheduled path locus on the XY-plane in answer to the working mode. As the working mode, there are a zigzag working mode, a spiral working mode, a spline working mode, a circular arc working mode, etc.

FIGS. 3A and 3B show such working modes, wherein FIG. 3A shows an example of the zigzag working mode of the scheduled path locus that is defined in a zigzag fashion on the XY-plane, and FIG.3B shows the spiral working mode of the scheduled path locus that is defined spirally on the XY-plane.

If the working mode is set by giving the data such as a pitch, etc., the scheduled path locus can be obtained as the orbit on the XY-plane such as a point OP1 to a point OP2, the point OP2 to a point OP3, the point OP3 to a point OP4, . . . in FIG. 3A or FIG. 3B.

The input data memory unit 12 stores the input data such as the orbit data input from the orbit data generating unit 11, the curved-surface data, the tool data, the feed speed data, etc. (step S2). The curved-surface state evaluating unit 20 evaluates the state of the curved-surface to be succeedingly worked based on the curved-surface data stored in the input data memory unit 12, then sets the evaluation points, and then form/store the evaluation data at the evaluation points (step S3).

The command speed deciding unit 30 decides the command speed to get the maximum working speed within the allowable speed and the allowable acceleration of the machine by utilizing effectively the evaluation data received from the curved-surface state evaluating unit 20 (step S4). In this case, the allowable speed and the allowable acceleration of the machine are decided from points of characteristics of the drive motor, suppression of the mechanical vibration, etc. The tool position data forming unit 40 forms quickly the tool position data, which are output from the command speed deciding unit 30 every predetermined sampling interval, in compliance with the command speed received from the command speed deciding unit 30 by using actively the above evaluation data (step S5).

The above operations are carried out in real time. However, for convenience' sake of the data processing executed by using plural pieces of data in respective post steps (details will be described later), respective operations are carried out in advance by predetermined number of data in the order of formation of the evaluation data in the curved-surface state evaluating unit 20, decision of the command speed in the command speed deciding unit 30, and formation of the too position data in the tool position data forming unit 40.

Next, the detail operation in step S3 in FIG. 2 will be explained with reference to the flowchart of FIG. 4. In step S30 in FIG. 4, the evaluation point deciding portion 21 calculates the valuation points to evaluate the curved surface in response to the scheduled path locus and then stores temporarily them in the evaluation point data buffer portion 22. This step S30 to calculate the valuation points will be explained later in more detail.

Then, three successive points are picked up from the evaluation points stored in the evaluation point data buffer portion 22. Then, a radius Rc of curvature of the circular arc passing through three points is calculated. Then, a curvature-based speed fsh corresponding to this radius Rc of curvature is calculated by using a following equation (step S31).

$$Fsh=\sqrt{(B \cdot Rc)}$$

Where B: allowable acceleration of the tool.

Depending on that the curvature-based speed fsh at the calculated evaluation point ep(j) can satisfy a following criterion formula, it is decided whether or not the concerned evaluation point ep(j) corresponds to a clamp point (step S32). In this case, fu is a user set speed that is the working speed set by the user and is stored in the input data memory unit 12.

$$fsh < fu$$

That is, it is decided whether or not the curvature-based speed fsh is smaller than the user set speed fu.

If fsh is smaller than fu, in step S33, a clamp flag FLG is set to 1 because the evaluation point ep(j) is the clamp point epc(n). Further, while going back to the evaluation point ep(x) next to the preceding clamp point epc(n−1) (see FIG. 8 described later), pointers PN of respective evaluation points ep(x), ep(x+1), ep(x+2), . . . are rewritten by counting the pointers PN (including the dummy value) of respective evaluation points to know the position of the clamp point epc(n) (the current evaluation point ep(j)) from respective evaluation points.

Figure 8:
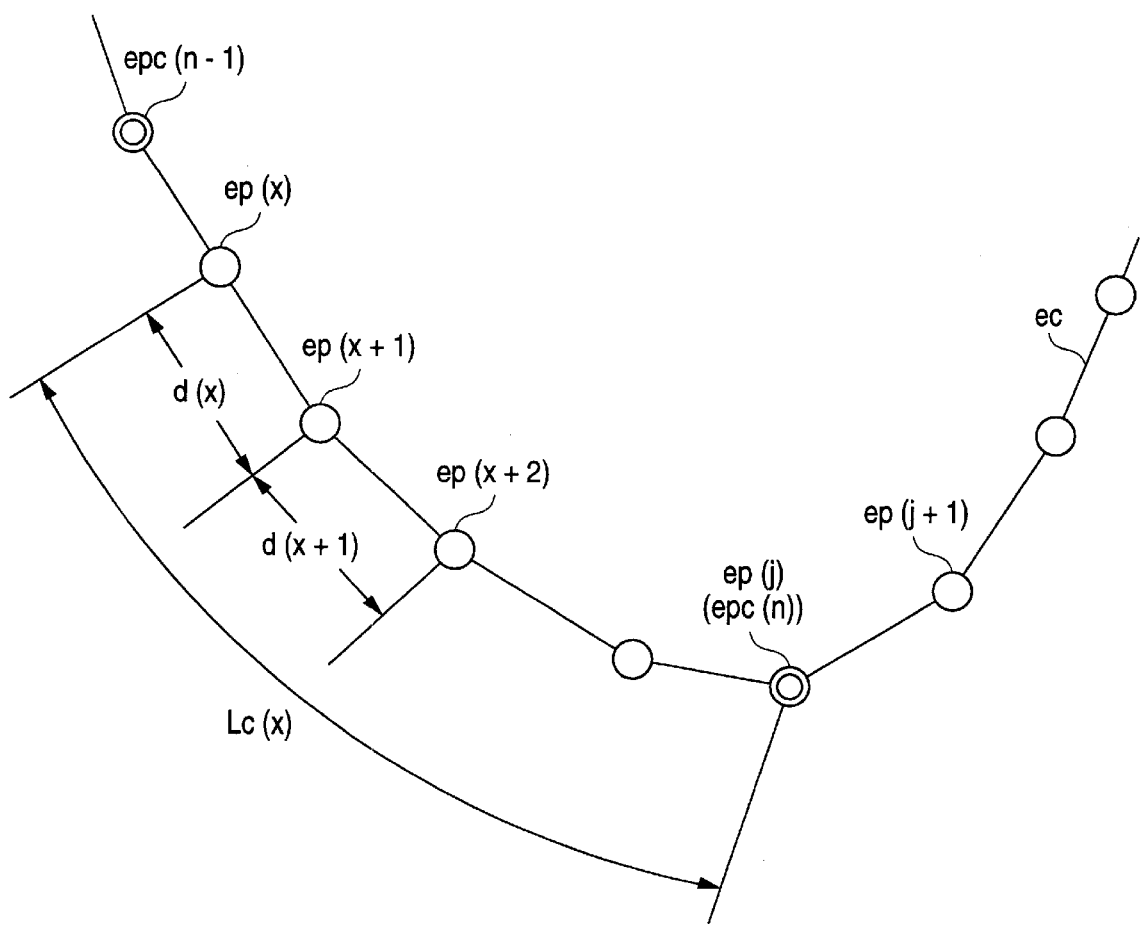
FIG. 8 is a view showing an example of evaluation points and clamp points calculated to evaluate the curved surface.

FIG. 8 is a view showing an example of evaluation points and clamp points calculated to evaluate the curved surface. The evaluation points ep(x), ep(x+1), . . . , ep(j+1) and the clamp points epc(n−1), epc(n) are calculated as mentioned above. FIG. 9 is a view showing the evaluation points calculated to evaluate the curved surface. In FIG. 9, T is the tool and ec is the evaluation line obtained by connecting the evaluation points by using a straight line.

In FIG. 8, for example, if the evaluation point positioned prior to the current evaluation point ep(j) (clamp point epc(n)) by five evaluation points is the clamp point epc(n−1), the pointers PN of the evaluation points ep(j−4), ep(j−3), ep(j−2), ep(j−1) in the evaluation data are given as 4, 3, 2, 1 respectively. In this case, the pointer PN at the clamp point ep(j) (epc(n)) is 0.

Then, in step S34, path lengths Lc(x), Lc(x+1), . . . from respective evaluation points ep(x), ep(x+1), . . . to the (succeeding) clamp point epc(n) between the current evaluation point ep(j) (epc(n)) and the preceding clamp point epc(n−1) in the evaluation data are rewritten (step S34). Where the path length is a sum of distances d(x), d(x+1), . . . between respective evaluation points positioned from respective evaluation points ep(x), ep(x+1), . . . to the clamp point epc(n).

In step S35, the passing speed Fp at the evaluation point ep(j) is set to the curvature-based speed fsh that is smaller than the user set speed fu. This speed fsh is the clamp point speed.

Unless the evaluation point ep(j) is the clamp point in step S32, the passing speed Fp is kept at the user set speed fu as it is, and the clamp flag FLG of the evaluation point ep(j) is set to 0 (step S36). Then, the process goes to step S37. In step S37, a distance between the preceding evaluation point ep(j−1) and the current evaluation point ep(j) is calculated, and a distance d(j−1) from the at the preceding evaluation point ep(j−1) to the succeeding evaluation point ep(j) is rewritten at the preceding evaluation point ep(j−1). A dummy value is inserted into the distance d(j−1) in the evaluation data at the preceding evaluation point ep(j−1) until the rewrite is completed.

The distance d(j) from the current evaluation point ep(j) to the succeeding evaluation point ep(j+1) in the evaluation data of the evaluation point ep(j) cannot be calculated until the succeeding evaluation point ep(j+1) is decided. Therefore, the dummy value is inserted.

The contents of the evaluation data at the evaluation point ep(j) calculated as above are given as follows, and evaluation data are the stored in the evaluation data memory portion 24 (step S38).

ep(j): parameter of the evaluation point.

coordinates (x,y,z): X,Y,Z axis coordinates of the evaluation point ep(j).

Rc: radius of curvature.

Fp: passing speed(user set speed fu or curvature-based speed (clamp point speed) fsh).

FLG: clamp flag indicating whether or not the current evaluation point ep(j) is the clamp point.

d(j): distance (dummy) to the succeeding evaluation point ep(j+1).

PN: pointer to the clamp point. An integer indicating the point number by which the succeeding clamp point epc (n) positioned prior to the concerned evaluation point ep(j) is counted forward from the concerned evaluation point ep(j) if the concerned evaluation point ep(j) is not the clamp point. Here the dummy value is inserted into the pointer PN and is replaced thereafter. If the concerned evaluation point ep(j) is the clamp point, 0 is inserted into the pointer PN.

Lc (j) sum of the distances between respective evaluation points positioned from the evaluation point ep(j) to the clamp point epc (n), i.e., path lengths from the evaluation point ep(j) to the clamp point epc(n). Here the dummy value is inserted.

Then, if the formation of the evaluation data of all evaluation points completed, the operation is ended(step S39).

The above operations are detailed operations of the evaluation of the curved-surface state and the formation of the evaluation data in step S3 in FIG. 3.

Figure 5:
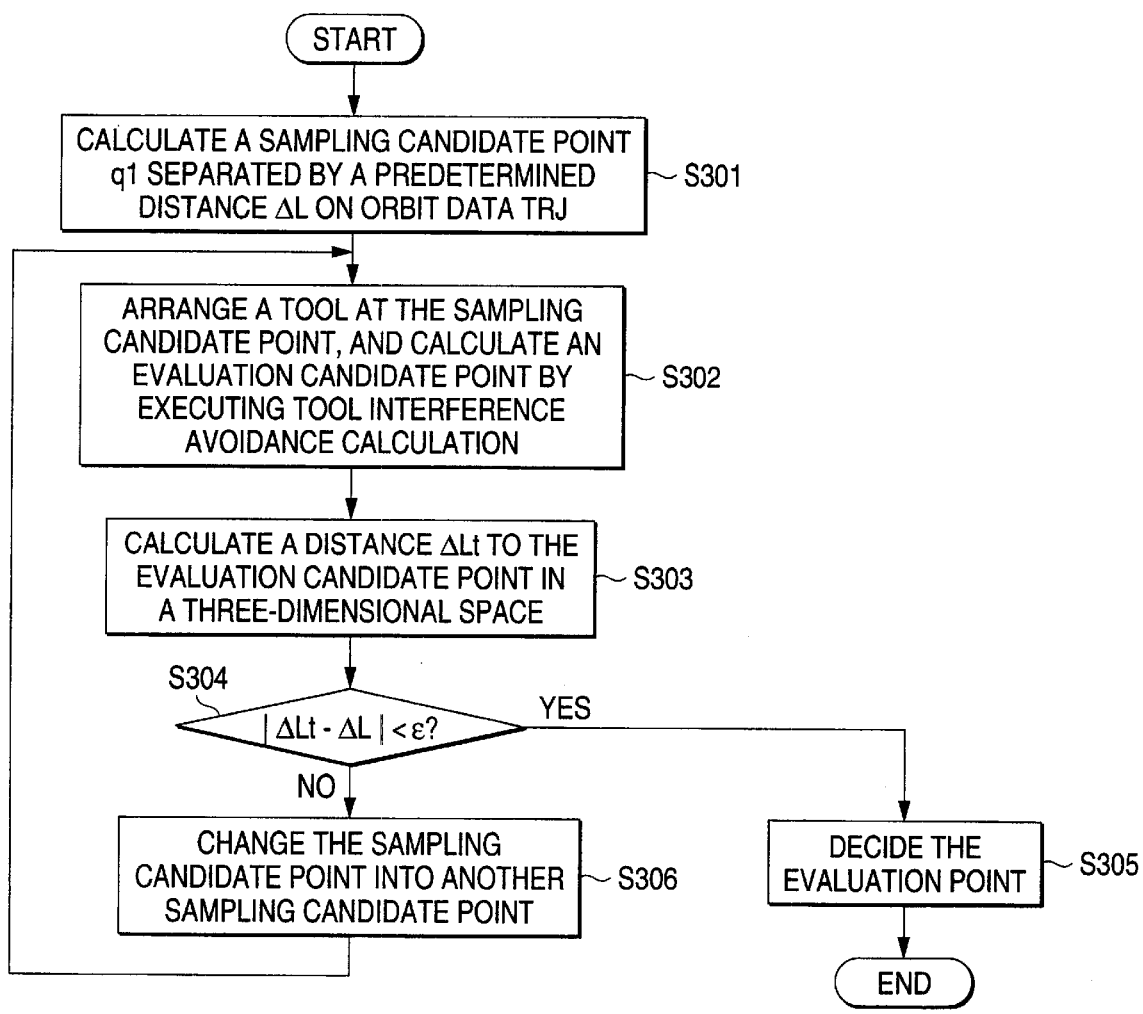
FIG. 5 is a flowchart showing an operation to calculate an evaluation point in the curved-surface state evaluating unit.

Then, the detailed operation to calculate an evaluation point in step S30 in FIG. 4 will be explained with reference to a flowchart in FIG. 5 hereunder. First, a sampling candidate point q1 is calculated on the scheduled path locus TRJ (in this example, a straight line). Here, as shown in FIG. 6B, it is assumed that the current sampling point is positioned at a point sp(j) on the scheduled path locus TRJ on the XY-plane, and the evaluation point on the three-dimensional space at this time is the point ep(j). Then, the sampling candidate point q1 separated by a predetermined distance ΔL from the current sampling point sp(j) is calculated on the scheduled path locus TRJ (step S301 in FIG. 5).

Figure 6A:
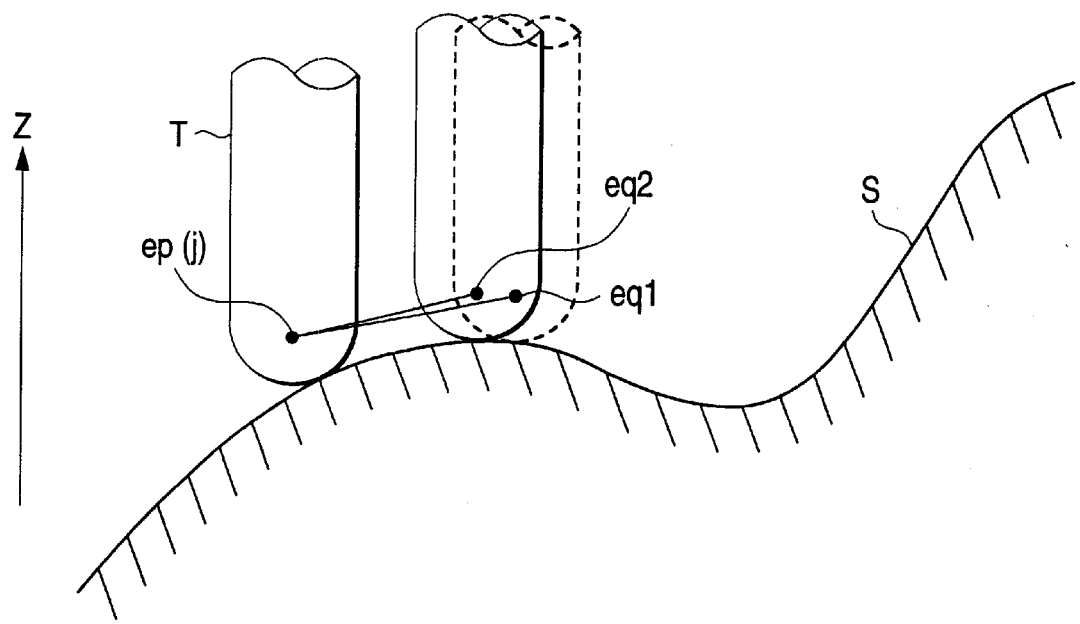
FIGS. 6A and 6B are views showing a concept to calculate a succeeding evaluation point from a current evaluation point on a curved surface.
Figure 6B:
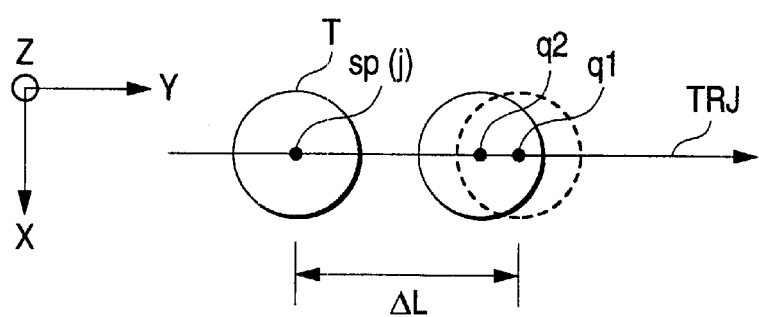

Then, as shown in FIG. 6A, the tool T is virtually arranged on the X, Y axis coordinates of the sampling candidate point calculated in above step S301 such that the tool does not interfaces with the curved-surface but comes into contact with the curved surface, and then the so-called tool interference avoidance calculation to calculate the coordinates of the tool position eq1 at this time is executed (step S302). The tool position at this time is called an evaluation candidate point eq1.

Figure 7A:
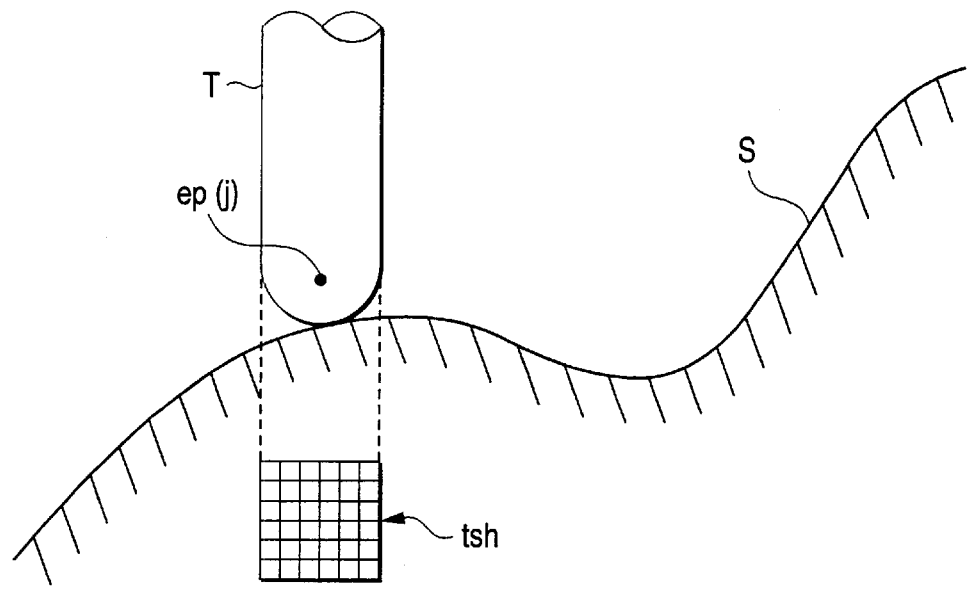
FIGS. 7A and 7B are views showing an example of tool interference avoidance calculation.
Figure 7B:
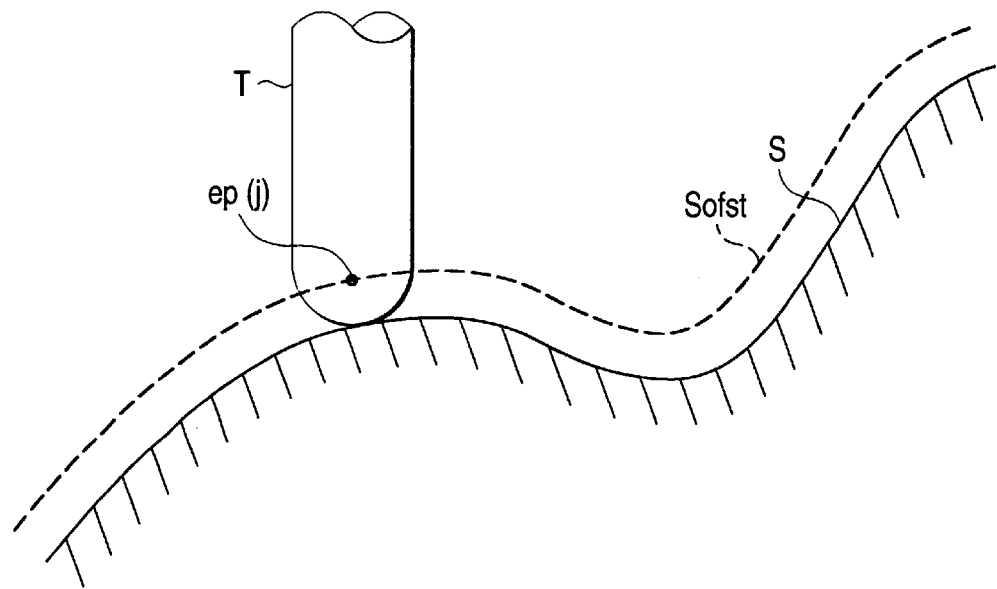

Details of the tool interference avoidance calculation in step S302 will be given as follow. FIGS. 7A and 7B are views showing a concept of an ordinary method of the tool interference avoidance calculation. The problem of this tool interference avoidance calculation is concluded as the problem to detect the Z axis coordinate contacting first to the curved surface S when the X, Y axis coordinates are set, then the tool T is arranged over the curved surface S on the X, Y axis coordinates, and then the tool T is put down gradually toward the curved surface S.

As shown in FIG. 7A, the tool can be set not to interface with the curved surface by virtually projecting the tool T onto the objective curved surface, then checking the interference between a number of sample points tsh (for the sake of simplicity, represented by a square mesh in FIG. 7A) on the curved surface S to which the tool T is projected and the tool T, and then calculating the coordinates of the tool position ep(j) as a center of the tool when the tool T comes into contact with the curved surface S.

The point calculated by such method such that the tool does not interface with the curved surface is the evaluation candidate point eq1.

Then, in step S303, a distance ΔLt between the current tool position ep(j) and the evaluation candidate point eq1 in the three-dimensional space is calculated. Then, it is decided whether or not a difference between the distance ΔLt and the distance ΔL used in step S301 is less than a predetermined previously decided infinitesimal value ϵ (step S304). As a result, if the difference between the distance ΔLt and the distance ΔL is smaller than the infinitesimal value ϵ, the evaluation candidate point eq1 is decided as the succeeding evaluation point ep(j+1) (step S305).

In contrast, if the difference between the distance ΔLt and the distance ΔL exceeds the infinitesimal value ϵ, the distance ΔLt is too far to employ. Therefore, the sampling candidate point is changed into another evaluation candidate point q2, for example, that is closer to the point sp(j) than the evaluation candidate point q1, on the scheduled path locus TRJ on the XY-plane (step S306), and then the process goes to step S302. Then, the evaluation candidate point eq2 that is smaller than the infinitesimal value ϵ is found by executing steps S302 to S304, and then this evaluation candidate point eq2 is decided as the evaluation point (step S305).

In order to calculate another evaluation candidate point q2 on the scheduled path locus TRJ on the XY-plane, the dichotomy maybe employed, for example. According to the above calculation, the point eq1 or the point eq2 that is closest to the distance ΔL can be obtained as the succeeding evaluation point.

The above explanation is the operation of the evaluation point deciding portion 21 in step S30 (FIG. 4), and the evaluation point to evaluate the curved-surface state can be derived in the above manner.

As the method of avoiding the interference between the tool and the curved surface, as shown in FIG. 7B, in addition to the above-mentioned method, the tool can be prevented from interfering with the curved surface by calculating an offset curved surface Sofst of the curved surface S and then deriving the coordinates of the center position ep(j) of the tool T from this offset curved surface Sofst.

In addition, as other interference preventing method, the method set forth in Patent Application Publication (KOKAI) Hei 6-83422, for example, may be employed. An outline of this method will be given as follows. First, curved-surface patches obtained by subdividing the curved-surface, that interferes in the tool, are roughly extracted by using the worked curved-surface including sphere tree.

Then, interfering finer curved-surface patches are extracted by using the interference check based on the bilinear patch, that approximates the curved-surface patches, while subdividing the extracted curved-surface patches. The interference avoidance calculation between the resultant planar patches and the tool is executed by executing this process until the curved-surface patches are subdivided into enoughly-flat curved-surface patches.

Figure 10:
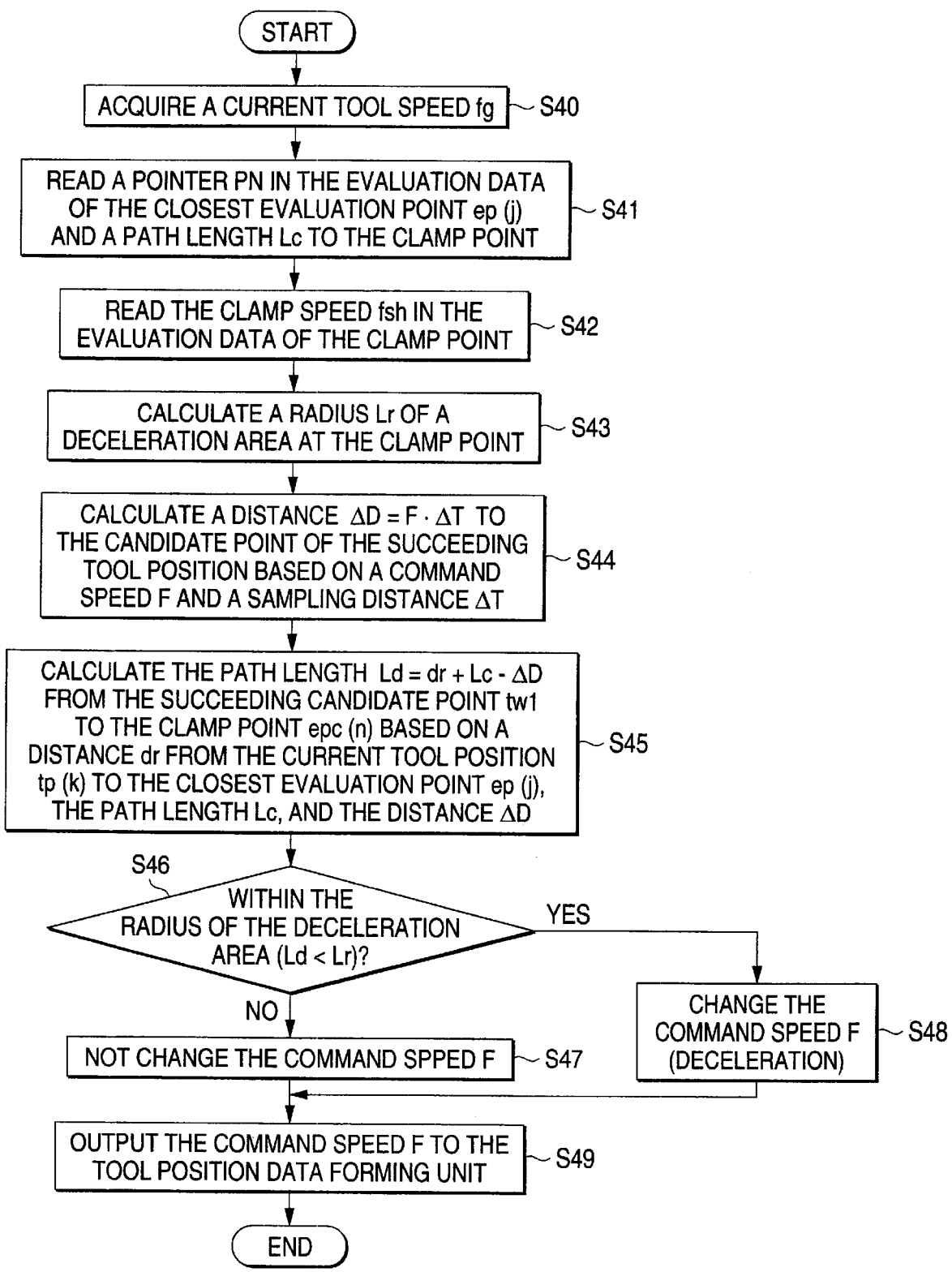
FIG. 10 is a flowchart showing an operation of a command speed deciding unit in FIG. 1.
Figure 11:
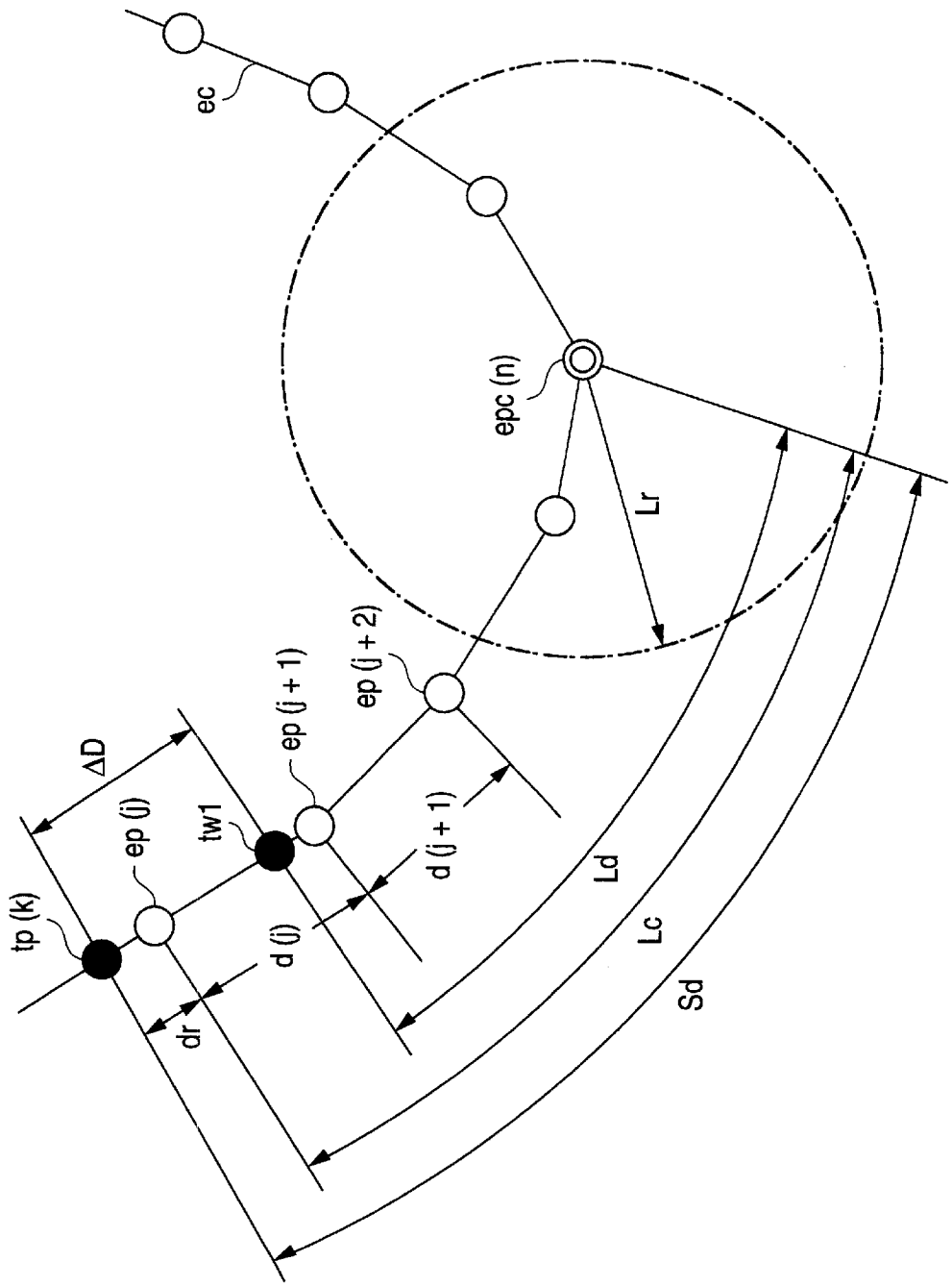
FIG. 11 is a view showing a relationship between a tool and the evaluation point and the clamp point.

Next, a detailed operation of the command speed deciding unit 30 in step S4 in FIG. 2 will be explained with reference to a flowchart in FIG. 10 and a relationship between the tool position and the clamp points in FIG. 11 hereunder. In the flowchart in FIG. 10, the command speed deciding unit 30 acquires the current tool speed fg from the tool driving motor or the current command speed, for example (step S40).

In step S41, the command speed deciding unit 30 searches the evaluation point that is positioned prior to the current tool position tp(k) (indicated by a black round mark shown in FIG. 11) on the scheduled path locus and is closest to the current tool position, i.e., the evaluation point ep(j) (indicated by a white round mark) next to the current tool position tp(k), and then reads the pointer PN in the evaluation data at the evaluation point ep(j). Also, the command speed deciding unit 30 reads the path length Lc(j) to the clamp point epc(n) (indicated by a double circle) from the evaluation point ep(j) whose curved surface state is previously evaluated and stored in the data memory portion 24.

In step S42, the clamp point epc(n) is searched by using this read pointer PN, and then the clamp speed fsh in the evaluation data of the clamp point epc(n) is read out.

In step S43, a radius Lr of a deceleration area at the clamp point is calculated based on a following equation. If the tool speed is fu, this equation to calculate the radius Lr of the deceleration area corresponds to a minimum distance required to decelerate the curvature-based speed fsh until the tool comes up to the clamp point.

$$Lr = (fu \cdot fu - fsh \cdot fsh)/2B$$

Where B: an allowable maximum speed of the machine.
In step S44, a distance $$\Delta D = F \cdot \Delta T$$

to the candidate point tw1 of the succeeding tool position (see FIG. 11) is calculated based on the command speed F and the sampling distance ΔT.

In step S45, the path length Ld from the succeeding candidate point tw1 to the clamp point epc(n) (see FIG. 11) is calculated based on a distance dr from the current tool position tp(k) to the evaluation point ep(j) closest to this tool position tp(k), the path length Lc(j) (in some case, referred simply to as Lc hereinafter) readout in above step S41 until the clamp point epc(n), and the above distance ΔD.

Where Sd=dr+Lc $$Ld = Sd - \Delta D = dr + Lc - \Delta D$$

In step S46, it is decided whether or not the succeeding candidate point tw1 to the clamp point epc(n) is within the radius Lr of the deceleration area of the clamp point epc(n). Then, if the succeeding candidate point tw1 is not within the radius Lr, the passing speed Fp is decided as the command speed F as it is since the deceleration is not needed (step S47). In FIG. 11, the deceleration is not needed since the candidate point tw1 is not contained within the radius Lr of the deceleration area. When the tool passed through the clamp point epc(n), the speed limit is not requested until the succeeding clamp point. Thus, the tool speed is accelerated at the maximum acceleration B tp return to the user set speed fu (fu≦fmax).

In step S46, if the candidate point tw1 is within the radius Lr of the deceleration area, the speed that can be decelerated within a time (sampling interval) ΔT from the current tool position tp(k) to the succeeding tool position tp(k+1) is given by B·ΔT (B: maximum acceleration). Therefore, the command speed F can be decided as $$F = fg - B \cdot \Delta T$$

by subtracting B·ΔT from the current speed fg (step S48)

Then, the command speed F is output to the tool position data forming unit 40 (step S49).

According to the above, the tool can be moved at the user set speed fu except the clamp point, and thus it is possible to work the working object at the maximum speed if the user set speed fu is set to the allowable maximum speed fmax of the machine.

Figure 12:
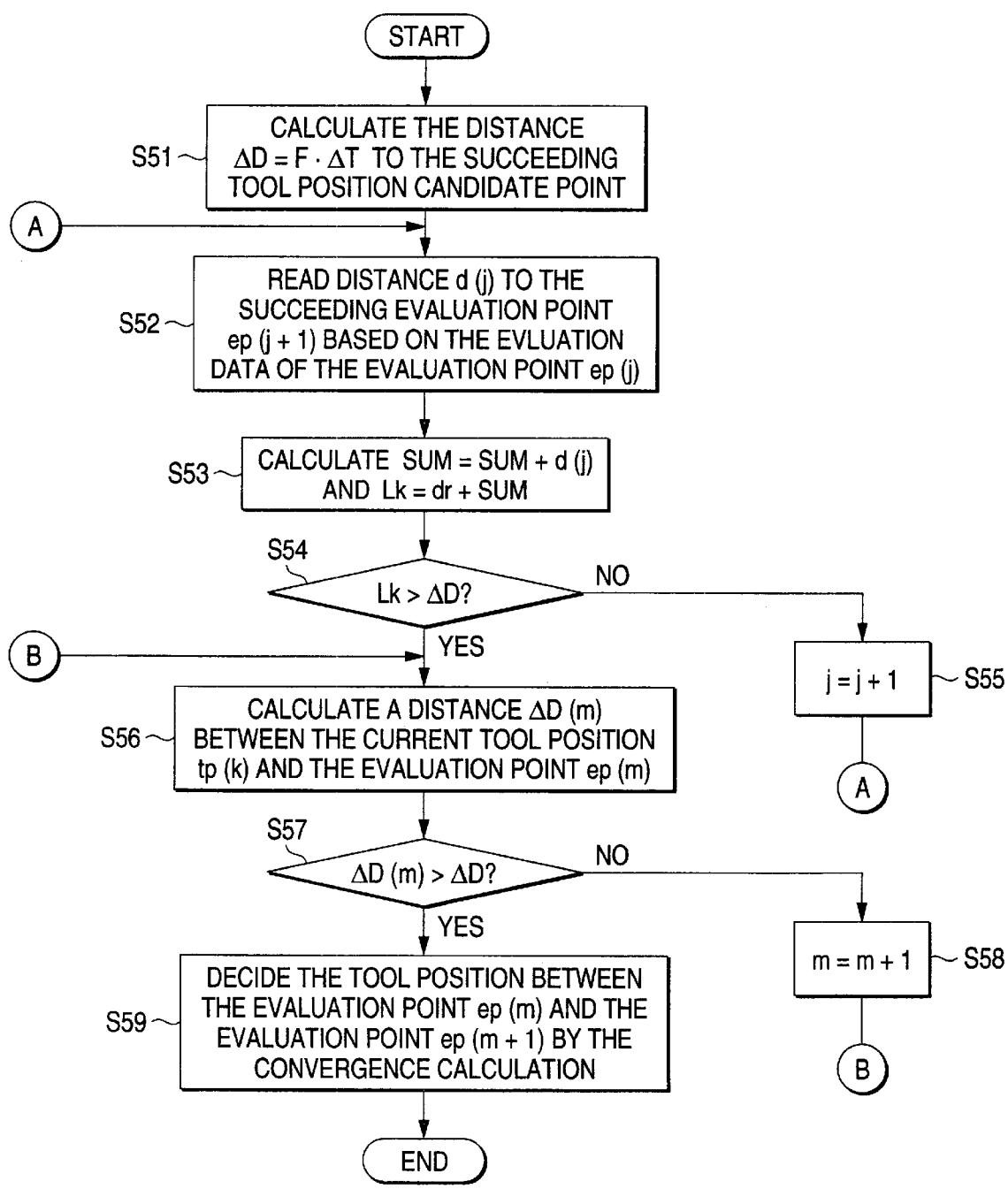
FIG. 12 is a flowchart showing an operation of a tool position data forming unit in FIG. 1.

Next, the tool position data forming unit 40 receives the command speed F from the command speed deciding unit 30 and decides the tool position as follows. In step S51 in FIG. 12, the distance ΔD=F·ΔT to the succeeding tool position candidate point, that is decided by the command speed F and the sampling interval ΔT, is calculated.

Figure 13:
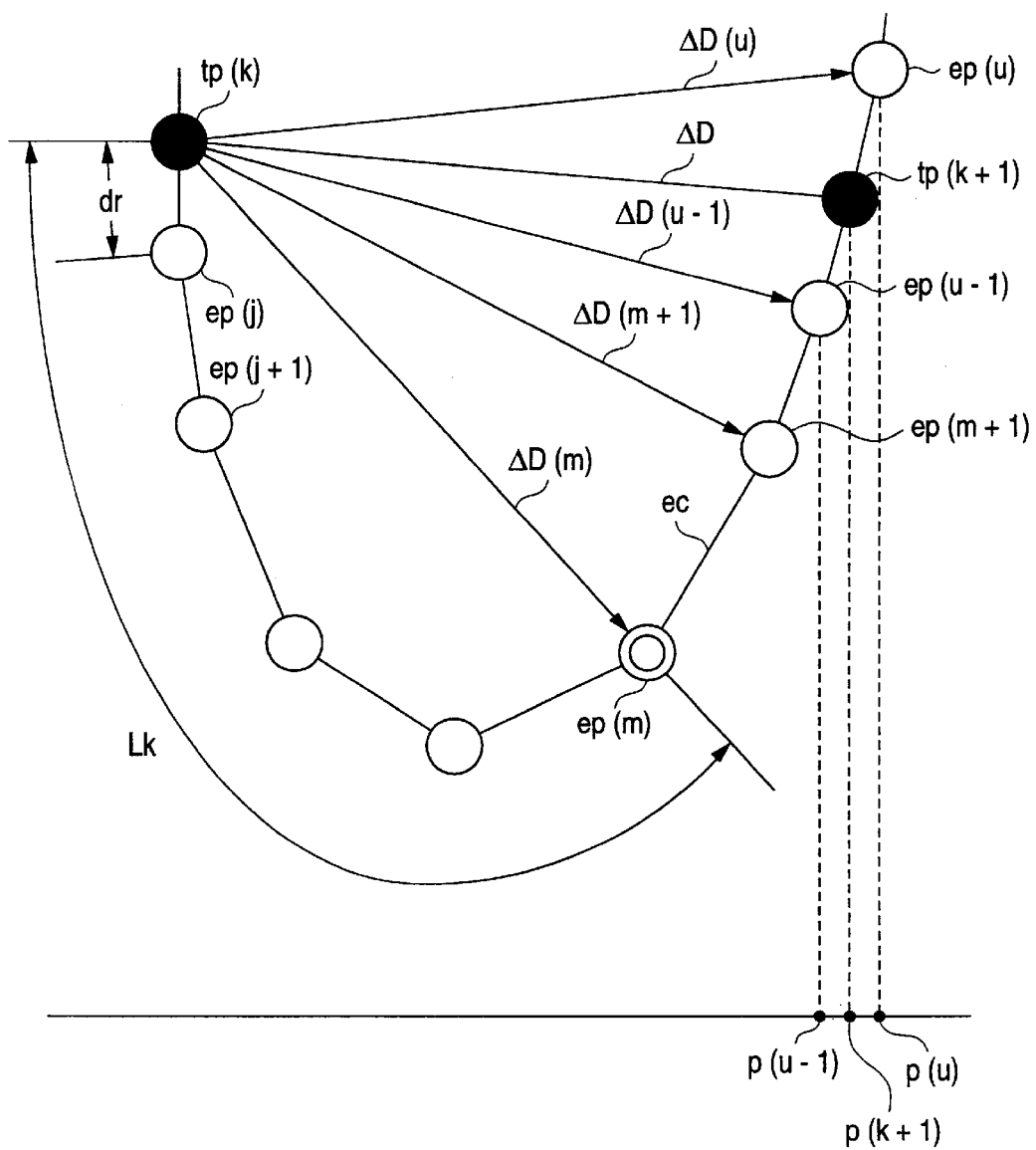
FIG. 13 is a view showing a process for deciding a tool position by using the evaluation points.

Then, distances d(j), d(j+1), d(j+2), . . . are read in sequence such that a distance d(j) to the succeeding evaluation point ep(j+1) in the evaluation data of the evaluation point ep(j) closest to the current tool position tp (k) in FIG. 13 is read, then a distance d(j+1) to the next but one evaluation point ep(j+2) from the evaluation data of the succeeding evaluation point ep(j+1) is read, and so on (step S52). Then, a sum Sum of the distances between respective evaluation points from the evaluation point ep(j) to the evaluation point ep(m), i.e., a path length Sum $$Sum = d(j) + d(j+1) + \ldots + ep(m-1)$$

is calculated. In addition, a path length Lk from the current tool position to the evaluation point ep(m)

$$Lk = dr + Sum$$

is calculated (step S53).

Next, the path length Lk obtained up to the evaluation point ep(j) is compared with the distance ΔD (step S54). Then, in step S54, if the path length Lk does not exceed the distance ΔD calculated in step S51, the evaluation point is incremented by one and j is replaced with j=j+1 in step S55. Then, the process returns to step S552, and then the distance d(j+1) obtained up to the succeeding evaluation point is added to Sum (step S53).

Then, in step S54, the path length Lk obtained up to the evaluation point ep(j +1) is compared with the distance ΔD. These operations are repeated until the path length Lk becomes larger than the distance ΔD. Then, when the path length Lk becomes larger than the distance ΔD, the process goes to step S56. The evaluation point immediately before the path length Lk becomes larger than the distance ΔD is set as ep(m).

Instep S56, a distance ΔL(m) from the current tool position tp(k) to the evaluation point ep(m) is calculated by utilizing the coordinates of the evaluation point ep(m). Then, it is decided whether or not the distance ΔD(m) is larger than the distance ΔD (step S57). Unless the distance ΔD(m) is larger than the distance ΔD, m is incremented by one (step S58). Then, the process returns to step S56, and then the distance ΔD(m+1) to the succeeding evaluation point ep(m+1) is calculated.

Then, the succeeding evaluation point, the next but one evaluation point, . . . are calculated successively until the distance ΔD(m) becomes larger than the distance ΔD. Then, it is assumed that, when the distance ΔD (m) becomes larger than the distance ΔD, the evaluation point is ep(u), the distance to the evaluation point ep(u) is ΔD(u), the preceding evaluation point is ep(u−1), and the distance to the evaluation point ep(u−1) is ΔD(u−1).

Then, in step S59, a point at which the distance to the current tool position tp(k) is equal to ΔD is found between the evaluation point ep(u−1) and the evaluation point ep(u), and then this point is set as the succeeding tool position tp(k+1) (step S59). At this time, according to the same method as that used to calculate the succeeding evaluation point by giving ΔL in step S30 in FIG. 4, the succeeding tool position tp(k+1) separated by the distance ΔD is decided by executing the convergence calculation by means of the dichotomy, or the like, for example, such that the tool is virtually arranged to just contact to the curved surface, i.e., the tool does not interface with the curved surface, based on the curved surface data stored in the input data memory unit 12.

In the above embodiment, normally the numerical control apparatus can be implemented by using the microcomputer having one microprocessor. Also, respective tasks such as generation of the orbit data and storing of the input data, evaluation of the curved-surface state, decision of the command speed, decision of the tool position, etc., for example, can be shared by using the microcomputer having a plurality of microprocessors, and thus the high speed processing can be achieved by executing these processes concurrently in real time.

Also, in the above embodiment, the curved-surface state evaluating unit 20 arrange virtually the tool to calculate respective evaluation points such that the tool comes into contact with the worked surface and the distance to the succeeding evaluation point becomes ΔL constant. Also, in order to increase the data processing speed, for example, the evaluation data can be obtained by setting the evaluation points at an equal distance on the scheduled path locus TRJ in FIG. 6B. In addition, the evaluation precision can be improved by setting the distance ΔL between the evaluation points considerably smaller than the feed distance ΔD=F·ΔT of the tool.

As described above, the high speed working can be achieved by evaluating the curved-surface state by using the curved-surface data stored in the input data memory unit 12 and also maximizing the speed up to the allowable speed of the machine or the user set speed according to the curved-surface state by positively using the evaluation data. In addition, the search range of the succeeding tool position is found based on the evaluation data of the curved surface and then the succeeding tool position may be searched within such search range, so that the succeeding tool position can be quickly decided. Accordingly, the tool position can be decided quickly and thus the productivity can be improved.

Also, formation of the tool path data prepared by the CAD/CAM system in the prior art can be omitted. The productivity can also be improved from this respect.

Further, the evaluation of the curved-surface state made by the curved-surface state evaluating unit 20, the decision of the command speed made by the command speed deciding unit 30, and the decision of the tool position made by the tool position data forming unit 40 are executed in real time while executing slightly precedingly the evaluation of the curved-surface state made by the curved-surface state evaluating unit 20. Therefore, the capacity of the evaluation data memory portion 24 of the curved-surface state evaluating unit 20 can be reduced and thus the system becomes inexpensive. Also, the overall processing time can be reduced and thus the productivity can also be improved.

In the above embodiments, the process applying portion of the system to be numerically controlled is the tool of the numerically controlled machine tool. But the present invention is not limited to the numerical control apparatus of the machine tool. The present invention may be employed as the numerical control apparatus of the robot system, etc. to achieve the similar advantages. As the robot system, for example, there are the robot system that can execute the finishing process of the processed surface by using the grindstone as the process applying portion, and others.

Since the present invention is constructed as explained above, advantages set forth in the following can be achieved.

A numerical control apparatus of the present invention comprises evaluating means for forming evaluation data of evaluation points containing a pointer representing a position of a succeeding clamp point, a path length to the succeeding clamp point, and a passing speed of a process applying portion to be passed through the evaluation point if the evaluation point corresponds to a clamp point, by arranging virtually the process applying portion of a system to be numerically controlled on a given scheduled path locus to come into contact with a processed surface of a processing object and by setting a plurality of evaluation points to evaluate a shape of the processed surface, where the clamp point signifies the evaluation point that is decided based on the shape of the processed surface such that the passing speed of the process applying portion passing through the evaluation point is subjected to restriction; command speed deciding means for deciding a command speed, at which the process applying portion is moved, by calculating a distance from a current process applying portion position to a closest succeeding evaluation point and then deciding necessity of a deceleration based on a path length from the current process applying portion position to the succeeding clamp point, that is calculated by reading the path length to the succeeding clamp point in evaluation data of the closest succeeding evaluation point and then adding such path length to this distance, the passing speed in the evaluation data of the clamp point, that is calculated by employing the pointer in the evaluation data of the closest succeeding evaluation point, and a speed of the current process applying portion; and process applying portion position data forming means for calculating a process applying portion position by arranging virtually the process applying portion to separate from a current process applying portion position by a predetermined distance and to come into contact with the processed surface, and then providing this calculated process applying portion position to the system to be numerically controlled. Therefore, since the evaluation data containing such contents are formed by evaluating the shape of the processing object, the speed of the process applying portion can be set appropriately in response to the shape and also the command speed can be decided to increase the processing speed. Also, since formation of the evaluation data and decision of the process applying portion position can be made based on the shape of the processing object, they can be decided from the shape of the processing object without the intervention of intermediate data and thus the increase of an amount of prepared data can be suppressed. Accordingly, the productivity can be improved.

Then, a numerical control apparatus of the present invention comprises evaluating means for forming evaluation data of evaluation points containing a distance to a succeeding evaluation point, by arranging virtually a process applying portion of a system to be numerically controlled on a given scheduled path locus to come into contact with a processed surface of a processing object and by setting a plurality of evaluation points to evaluate a shape of the processed surface; command speed deciding means for deciding a command speed, at which the process applying portion is moved, by deciding necessity of a deceleration based on the evaluation data; and process applying portion position data forming means for calculating an evaluation point such that a path length that is a sum of distances obtained by adding successively distances to a succeeding evaluation point in the evaluation data of respective evaluation points exceeds a predetermined length while using a succeeding evaluation point closest to a current process applying portion position as an initial point, then searching a process applying portion position, that is separated from the current process applying portion position by a predetermined distance, by arranging virtually the process applying portion to come into contact with the processed surface while using this calculated evaluation point as a starting point, and then providing this searched process applying portion position to the system to be numerically controlled. Therefore, if the evaluation data containing the distance to the succeeding evaluation point are formed by evaluating the shape of the processing object, the succeeding process applying portion position separated from the current process applying portion position by a predetermined distance can be calculated by utilizing the evaluation data to skip the evaluation points located from the current process applying portion position to the searched evaluation point while using the searched evaluation point as the starting point, and therefore such succeeding process applying portion position can be quickly decided. Also, since formation of the evaluation data and decision of the process applying portion position can be made based on the shape of the processing object, they can be decided from the shape of the processing object without the intervention of intermediate data and thus the increase of an amount of prepared data can be suppressed. Accordingly, the productivity can be improved.

In addition, a numerical control apparatus of the present invention comprises evaluating means for forming evaluation data of evaluation points containing a pointer representing a position of a succeeding clamp point, a path length to the succeeding clamp point, and a passing speed of a process applying portion to be passed through the evaluation point if the evaluation point corresponds to a clamp point, by arranging virtually the process applying portion of a system to be numerically controlled on a given scheduled path locus to come into contact with a processed surface of a processing object and by setting a plurality of evaluation points to evaluate a shape of the processed surface, where the clamp point signifies the evaluation point that is decided based on the shape of the processed surface such that the passing speed of the process applying portion passing through the evaluation point is subjected to restriction; command speed deciding means for deciding a command speed, at which the process applying portion is moved, by calculating a distance from a current process applying portion position to a closest succeeding evaluation point and then deciding necessity of a deceleration based on a path length from the current process applying portion position to the succeeding clamp point, that is calculated by reading the path length to the succeeding clamp point in evaluation data of the closest succeeding evaluation point and then adding such path length to this distance, the passing speed in the evaluation data of the clamp point, that is calculated by employing the pointer in the evaluation data of the closest succeeding evaluation point, and a speed of the current process applying portion; and process applying portion position data forming means for calculating an evaluation point such that a path length that is a sum of distances obtained by adding successively distances to a succeeding evaluation point in the evaluation data of respective evaluation points exceeds a predetermined length while using a succeeding evaluation point closest to a current process applying portion position as an initial point, then searching a process applying portion position, that is separated from the current process applying portion position by a predetermined distance, by arranging virtually the process applying portion to come into contact with the processed surface while using this calculated evaluation point as a starting point, and then providing this searched process applying portion position to the system to be numerically controlled. Therefore, since the evaluation data containing such contents are formed by evaluating the shape of the processing object, the speed of the process applying portion can be set appropriately in response to the shape and also the command speed can be decided to increase the processing speed. Also, the succeeding process applying portion position separated from the current process applying portion position by a predetermined distance can be calculated by utilizing the evaluation data to skip the evaluation points located from the current process applying portion position to the searched evaluation point while using the searched evaluation point as the starting point, and therefore such succeeding process applying portion position can be quickly decided. Also, since formation of the evaluation data and decision of the process applying portion position can be made based on the shape of the processing object, they can be decided from the shape of the processing object without the intervention of intermediate data and thus the increase of an amount of prepared data can be suppressed. Hence, the productivity can be improved.

Further, the evaluating means picks up three successive evaluation points from the evaluation points, and then executes evaluation of the processed surface based on a curvature of a circular arc passing through three points. Therefore, the evaluation can be performed appropriately by executing the evaluation of the processes surface in response to the curvature.

Besides, respective operations of the evaluating means, the command speed deciding means, and the process applying portion position data forming means are executed in real time. Therefore, the overall processing time can be shortened by executing these operations in real time and thus the productivity can be improved.

What is claimed is:

1. A numerical control apparatus comprising:

an evaluating section for forming evaluation data of an evaluation point containing a pointer representing a position of a succeeding clamp point, a path length to the succeeding clamp point, and a passing speed of a process applying portion to be passed through the evaluation point if the evaluation point corresponds to a clamp point, by arranging, virtually, the process applying portion of a system to be numerically controlled on a given scheduled path locus to come into contact with a processed surface of a processing object, and by setting a plurality of evaluation points to evaluate shape of the processed surface, where the clamp point signifies the evaluation point that is decided based on the shape of the processed surface such that the passing speed of the process applying portion passing through the evaluation point is restricted;

a command speed deciding section for deciding a command speed at which the process applying portion is moved, by calculating (i) a distance from a current process applying portion position to a closest succeeding evaluation point and then deciding whether a deceleration based on a path length from the current process applying portion position to the succeeding clamp point is necessary, the path length being calculated by reading the path length to the succeeding clamp point in evaluation data of the closest succeeding evaluation point and adding the path length calculated to the distance, (ii) the passing speed in the evaluation data of the clamp point, the passing speed being calculated by employing the pointer in the evaluation data of the closest succeeding evaluation point, and (iii) speed of the current process applying portion; and a process applying portion position data forming section for calculating a process applying portion position by arranging, virtually, the process applying portion to separate from a current process applying portion position by a predetermined distance and to come into contact with the processed surface, and then providing the process applying portion position calculated to the system to be numerically controlled.

2. The numerical control apparatus according to claim 1, wherein the evaluating means picks three successive evaluation points from the evaluation points, and evaluates the processed surface based on a curvature of a circular arc passing through the three points.

3. The numerical control apparatus according to claim 1, wherein respective operations of the evaluating means, the command speed deciding means, and the process applying portion position data forming means are executed in real time.

4. A numerical control apparatus comprising:

an evaluating section for forming evaluation data of an evaluation point containing a distance to a succeeding evaluation point, by arranging, virtually, a process applying portion of a system to be numerically controlled on a given scheduled path locus to come into contact with a processed surface of a processing object, and by setting a plurality of evaluation points to evaluate shape of the processed surface;

a command speed deciding section for deciding a command speed, at which the process applying portion is moved, by deciding whether a deceleration, based on the evaluation data, is necessary; and a process applying portion position data forming section for calculating an evaluation point such that a path length that is a sum of distances obtained by adding successive distances to succeeding evaluation points in the evaluation data of respective evaluation points, exceeds a predetermined length, while using a succeeding evaluation point closest to a current process applying portion position as an initial point, then searching for a process applying portion position that is separated from the current process applying portion position by a predetermined distance, by arranging, virtually, the process applying portion to come into contact with the processed surface while using this evaluation point calculated as a starting point, and providing the process applying portion position found in searching to the system to be numerically controlled.

5. The numerical control apparatus according to claim 4, wherein the evaluating means picks three successive evaluation points from the evaluation points, and evaluates the processed surface based on a curvature of a circular arc passing through the three points.

6. The numerical control apparatus according to claim 4, wherein respective operations of the evaluating means, the command speed deciding means, and the process applying portion position data forming means are executed in real time.

7. A numerical control apparatus comprising:

an evaluating section for forming evaluation data of an evaluation point containing a pointer representing a position of a succeeding clamp point, a path length to the succeeding clamp point, and a passing speed of a process applying portion to be passed through the evaluation point if the evaluation point corresponds to a clamp point, by arranging, virtually, the process applying portion of a system to be numerically controlled on a given scheduled path locus to come into contact with a processed surface of a processing object, and by setting a plurality of evaluation points to evaluate shape of the processed surface, where the clamp point signifies the evaluation point that is decided based on the shape of the processed surface such that the passing speed of the process applying portion passing through the evaluation point is restricted;

a command speed deciding section for deciding a command speed at which the process applying portion is moved, by calculating (i) a distance from a current process applying portion position to a closest succeeding evaluation point and then deciding whether a deceleration based on a path length from the current process applying portion position to the succeeding clamp point is necessary, the path length being calculated by reading the path length to the succeeding clamp point in evaluation data of the closest succeeding evaluation point and adding the path length calculated to the distance, (ii) the passing speed in the evaluation data of the clamp point, the passing speed being calculated by employing the pointer in the evaluation data of the closest succeeding evaluation point, and (iii) speed of the current process applying portion; and a process applying portion position data forming section for calculating an evaluation point such that a path length that is a sum of distances obtained by adding successive distances to succeeding evaluation points in the evaluation data of respective evaluation points, exceeds a predetermined length, while using a succeeding evaluation point closest to a current process applying portion position as an initial point, then searching for a process applying portion position that is separated from the current process applying portion position by a predetermined distance, by arranging, virtually, the process applying portion to come into contact with the processed surface while using this evaluation point calculated as a starting point, and providing the process applying portion position found in searching to the system to be numerically controlled.

8. The numerical control apparatus according to claim 7, wherein the evaluating means picks three successive evaluation points from the evaluation points, and evaluates the processed surface based on a curvature of a circular arc passing through the three points.

9. The numerical control apparatus according to claim 7, wherein respective operations of the evaluating means, the command speed deciding means, and the process applying portion position data forming means are executed in real time.

* * * * *